United States Patent [19]
Morisaki

[11] Patent Number: 5,416,513
[45] Date of Patent: May 16, 1995

[54] METHOD FOR AUTOMATICALLY PURSUING OBJECT BY VIDEO CAMERA

[75] Inventor: Hideki Morisaki, Tokyo, Japan

[73] Assignee: Victor Company of Japan, Ltd., Yokohama, Japan

[21] Appl. No.: 297,632

[22] Filed: Aug. 29, 1994

Related U.S. Application Data

[63] Continuation of Ser. No. 39,815, Mar. 29, 1993, abandoned.

[30] Foreign Application Priority Data

Mar. 31, 1992 [JP] Japan ................................. 4-103802

[51] Int. Cl.$^6$ ........................... H04N 7/18; H04N 9/11
[52] U.S. Cl. ..................................... 348/169; 348/157
[58] Field of Search ............... 348/169, 157, 143, 161, 348/170, 135-137, 295, 702, 700, 155, 208, 219; H04N 7/18, 9/11, 5/285, 5/253

[56] References Cited

U.S. PATENT DOCUMENTS

| | | | |
|---|---|---|---|
| 3,840,699 | 10/1974 | Bowerman | 358/125 |
| 5,204,749 | 4/1993 | Toyama et al. | 348/169 |

FOREIGN PATENT DOCUMENTS 254107  10/1985  Japan ................................. 358/125

OTHER PUBLICATIONS

Advertisement by a sales company "SUNPAK" which appeared in the Nov., 1991 issue of "Video Salon" magazine.

Primary Examiner—Tommy P. Chin
Assistant Examiner—Vu Le
Attorney, Agent, or Firm—Michael N. Meller

[57] ABSTRACT

An automatic pursuing method in which a video camera pursues an object by utilizing a specific color picked from a shooting object and register it which is represented by a specific color signal so that drawbacks inherent to conventional methods utilizing sound or an infrared light are prevented. The method comprises a color registration step for selecting a specific color of color components of the object and registering the specific color, a signal detecting step for detecting a first signal-representing the specific color registered in the color signal registration step out of a second signal representing a camera image containing the object to be shot by the video camera, a dividing and determining step for dividing the camera image into a plurality of regions and determining which one of the plurality of regions contains most of the first signal representing the specific color, and a drive control step for rotating the video camera and for directing an optical axis of the video camera toward the one of the plurality of regions upon its determination.

13 Claims, 4 Drawing Sheets

METHOD FOR AUTOMATICALLY PURSUING OBJECT BY VIDEO CAMERA

This application is a continuation of application Ser. No. 08/039,815, filed Mar. 29, 1993, now abandoned.

BACKGROUND OF THE INVENTION

Field of the Invention

The present invention relates to a method for automatically pursuing an object by a video camera and, particularly, to a method for automatically pursuing an object by detecting a position of the object on the basis of its specific color and rotating a video camera according to the directed position.

Description of the Related Art

In case where a moving object is pursued by a video camera, it is difficult to pursue the object by manually control the video camera when a moving range of the object is extensive or its moving speed is high. In view of this fact, an automatic pursuing device capable of controlling a rotation (panning horizontally or vertically or both) of a video camera is highly desired.

For example, in a case where an object to be pursued is an animal, a player of a ball game or a ball itself, a movement thereof is usually unpredictable. Therefore, in order to pursue such unpredictable movement, a camera-man who operates a video camera is required to be highly skilled, otherwise, there causes a missing object out of a camera image (a video image produced by a video camera, which corresponds to a full field of vision viewed and taken by the video camera) or such object not located at a center portion of the camera image as desired, if not missed from the camera image.

Further, when the operator himself is the object or desired to be shot together with an other object, such automatic pursuit device is highly desired.

To this end, various automatic pursuing methods have been proposed, such as a method in which a video camera is directed to an object generating sound as a guidance marker which is louder than the environment or a method in which a video camera pursues infrared ray emitted from an infrared emitter carried by the object as a guidance marker.

In these methods, an audio signal or an optical signal obtained from a microphone or an infrared light receiving section which is equipped on a video camera is analyzed to obtain a position of the sound source or the light source and the video camera is automatically rotated according to the detected position as such that its line of sight is directed to the source. Such methods have been used to date.

Such conventional methods have drawbacks or demerits such as follows:

The method utilizing sound is completely ineffective to any object which does not produce sound or when such object stops sounding. The sound pursuing method is also ineffective if there is another sound source or sources which may sound louder than or interfere with the sound of the intended object so that the direction of the video camera is confused.

On the other hand, in the infrared pursuing method, it is necessary to provide an infrared light source on the object. This may be achieved by preparing a portable light source separately from the video camera and providing a light receiving device on the video camera. However, this causes the construction of the system to be complicated and expensive.

As mentioned in the foregoing, these method have limitations, as it can not be applied practically to an object such as animal or ball in a ball game.

SUMMARY OF THE INVENTION

An object of the present invention is to provide a method for automatically pursuing an object by utilizing a specific color picked up from a shooting object and register it as a specific color signal so that drawbacks inherent to conventional methods utilizing sound or an infrared light are prevented, and the method is capable of smoothly and automatically pursuing the object with high accuracy.

The method comprises a color registration step for selecting a specific color of color components of the object and registering the specific color, a signal detecting step for detecting a first signal representing the specific color registered in the color signal registration step out of a second signal representing a camera image containing the object to be shot by the video camera, a dividing and determining step for dividing the camera image into a plurality of regions and determining which one of the plurality of regions contains most of the first signal representing the specific color, and a drive control step for rotating the video camera and for directing an optical axis of the video camera toward the one of the plurality of regions upon its determination.

Therefore, it is possible to automatically control a shooting direction of the video camera in response to an amount of a specific signal representing the specific color in one of the divided regions of the camera image, which varies with a movement of the object in the camera image, thereby placing the object always in a central portion of the camera image.

In the dividing and determining step of the method of present invention, the camera image is divided into two vertical or horizontal regions, boundaries between left and right or up and down regions are offset each other equally from a center line of the camera image, and amounts of the specific color signal representing the specific color distributed in the divided regions are compared each other to determine, as a determination result, which one of the divided region contains most of the specific color signal.

In the drive control step, rotation of the video camera is controlled according to the determination result such that 2 comparisons are actually performed respectively in 2 left and right regional pairs or 2 up and down regional pairs, and when the 2 comparison results indicate same statuses each other, the rotation of the video camera is stopped, if different each other, the optical axis of the video camera is directed toward the region from which a largest amount of the specific color signal is detected. With this scheme, it is possible to prevent a hunting movement of the video camera which may occur otherwise when the object is located substantially at the center portion of the slow moving camera image. Further in the drive control step, rotational speed of the video camera is controlled to be changed corresponding to the magnification of the shot camera image, namely, the changed magnification of zoom lens equipped on the video camera. This enables the video camera to smoothly pursue the object even in a zooming up operation.

Further, when a movement of the object is very fast in the camera image, the rotational speed of the video camera may be not enough to pursue it, resulting in the object being lost from the camera image. Such problem is solved in the present invention by providing subregions in both sides of the camera image in the dividing and determining step and by controlling the rotational speed of the video camera higher than a standard speed when the specific color signal detected in one of the sub-regions is larger than those detected in other regions.

Other objects and further features of the present invention will be apparent from the following detailed description with respect to preferred embodiments of the invention when read in conjunction with the accompanying drawings.

DETAILED DESCRIPTION OF THE PREFERRED EMBODIMENTS

An embodiment of the present invention will be described with reference to the drawings.

Figure 1:
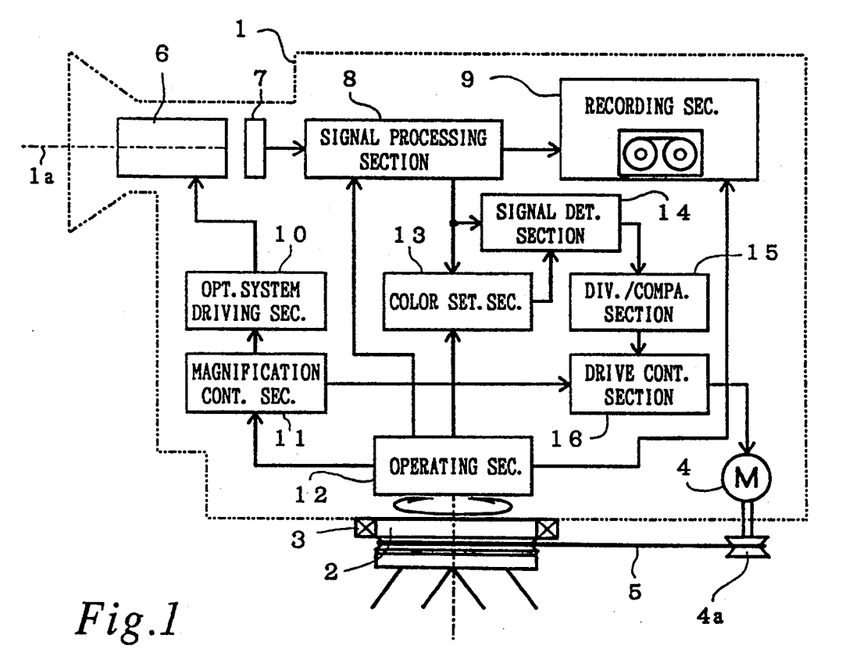
FIG. 1 is a block circuit diagram of a video camera system to which an object pursuing method according to the present invention is applied.

FIG. 1 is a block circuit diagram of a video camera system including an object pursuing device. In FIG. 1, a video camera 1 is rotatably mounted on a tripod base 2 by means of rollers 3. A belt 5 is provided between a pulley 4a of a motor 4 housed in the video camera 1 and an outer peripheral groove of the tripod base 2 around which the video camera 1 is rotated when the motor 4 revolves.

The video camera 1 includes an optical system 6, a CCD image element 7, a signal processing section 8, a recording section 9, an optical system driving section 10, a magnification control section 11 and an operation section 12, as usual. The video camera 1 further includes, according to the present invention, a tracking control circuit which comprises a color setting section 13, a signal detector section 14, a division/comparison section 15 and a motor driver 16.

The color setting section 13 functions to register a color signal of a specific color, which will be referred to as "specific color signal" hereinafter and which is obtained from color difference signals (R-Y signal and B-Y signal) obtained by the signal processing section 8 according to an instruction from the operation section 12, and the signal detector section 14 functions to detect only the specific color signal included in a signal of camera image by comparing the signal of the camera image obtained by the signal processing section 8 with the specific color signal registered in the color setting section 13. The division/ comparison section 15 functions to divide the camera image to right and left regions and compare them to determine one of the regions in which an amount of the specific color signal detected is larger than the other. The motor driver 16 responds to a result of comparison made in the division/ comparison section 15 to control rotational direction of the motor 4 so that an optical axis 1a of the video camera 1 is directed to the region in which the specific color signal detected is larger than that in the other.

Further, when the video camera 1 is rotated by the motor 4, the motor driver 16 controls the rotational speed of the motor 4 corresponding with an image magnification information from the magnification control section 11.

An operation of the pursuit control circuit will be described in detail with reference to FIGS. 2 and 3. It is assumed in the following description that a blue color from an object (such as a person shown in FIG. 2 who wears a sweater including a blue colored portion B, a yellow colored portion Ye and a red colored portion R) is registered as the specific color and the object is shot by the video camera 1 while pursuing the specific color.

Figure 3:
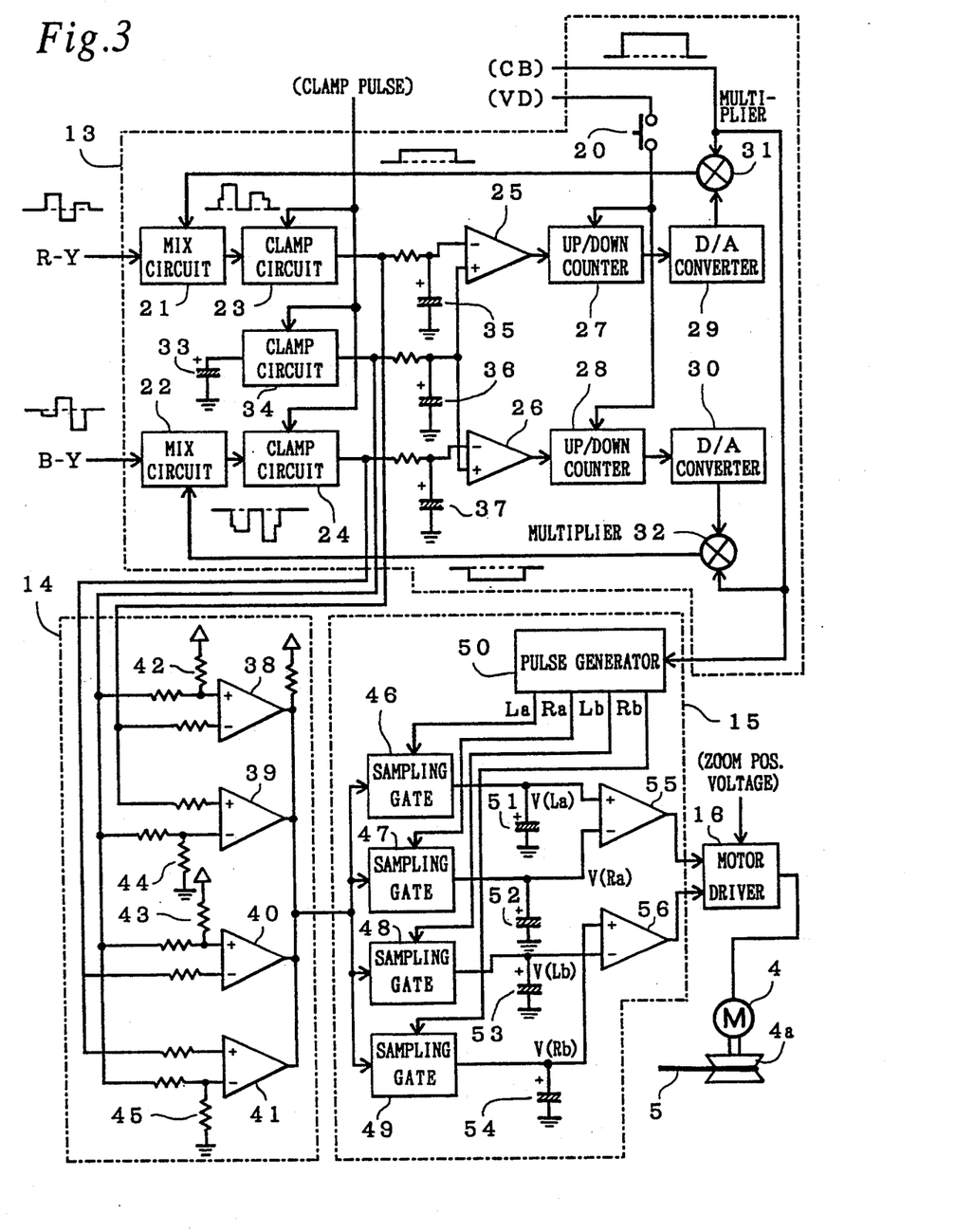
FIG. 3 is a circuit diagram of a pursuit control circuit.

FIG. 3 shows an electric circuit diagram of the pursuit control circuit including the color setting section 13, the signal detector section 14, the division/comparison section 15 and the motor driver 16 including the motor 4.

It is assumed that a color memory switch 20 provided in the operation section 12 is turned ON manually under the condition that the portion of the object which is colored with the specific color, that is, blue, is enlarged to full scale on a camera image by shooting the object with a high magnification by supplying the video camera 1 with a zoom-up instruction from the operation section 1 in FIG. 1.

Under this condition, color difference signals (R-Y signal and B-Y signal) obtained from the signal processing section 8 which are related to the blue color are acquired in the color setting section 13 in which these color difference signals are regulated by closed loops including mixers 21 and 22, clamp circuits 23 and 24, comparators 25 and 26, UP/DOWN counters 27 and 28, D/A converters 29 and 30 and multipliers 31 and 32 connected back to the mixers 21 and 22, respectively, so that color difference levels thereof become coincident with a pedestal level.

In detail, the color memory operation is implemented as follows:

First, the clamp circuits 23 and 24 hold signals obtained from the mixers 21 and 22 in synchronism with clamp pulses outputted during a horizontal scanning period, respectively. Another clamp circuit 34 also included in the color setting section 13 and grounded by an electrolytic capacitor 33 holds the pedestal level. Output voltages of the clamp circuits 23 and 34 which are held respectively by electrolytic capacitors 35 and 36 are compared with each other by the comparator 25 and the output of the clamp circuit 34 which is held by the electrolytic capacitor 36 is compared by the comparator 26 with an output voltage of the clamp circuit 24 which is held by an electrolytic capacitor 37. Outputs of the comparators 25 and 26 are supplied to the UP/DOWN counters 27 and 28, respectively, which operate while the color memory switch 20 is held manually in the ON state.

Responding to "H" or "L" outputs of the comparators 25 and 26 the UP/DOWN counters 27 and 28 respectively count "up" (when H) or "down" (when L)

vertical drive pulses VD inputted through the color memory switch 20.

On the other hand, outputs of the UP/DOWN counters 27 and 28 are converted into analog signals by the D/A converters 29 and 30 and then multiplied by composite blanking pulses CB (CB pulse) in the multipliers 31 and 32, respectively. The CB pulse has a zero level during horizontal and vertical blanking periods and a predetermined level during the periods other than the blanking periods. Resultant CB pulses, levels of which are determined by the multiplication, are fed back to the mixers 21 and 22 where they are mixed with the respective color difference signals.

As a result, counted values of the UP/DOWN counters 27 and 28 are converged as such that each level of the respective color difference signals coincides with the pedestal level. When, in this state, the color memory switch 20 is turned OFF, the multipliers 31 and 32 continues thereafter outputting the CB pulses having levels corresponding to the converged counted values to the respective mixers 21 and 22.

Then, the magnification is changed to a lower value by an instruction from the operation section 12 and the operation is transferred to the pursuing mode.

Since the camera image in this stage contains not only the object but also a background thereof, the respective color difference signals obtained from the signal processing section 8 necessarily change according to the movement of the object and/or a state of the background scene.

Therefore, the output signals of the clamp circuits 23 and 24 are changed accordingly. However, these signals are composed such that signal components corresponding to the blue color are cancelled out in the R-Y signal and the B-Y signal, since the mixers 21 and 22 mix the respective color difference signals with the CB pulses from the multipliers 31 and 32 whose levels are set by the color memory operation.

The signals from the clamp circuits 23 and 24 and the signal having the pedestal level from the clamp circuit 34 are further supplied to the signal detector section 14 including comparators 38, 39, 40 and 41.

The comparators 38 and 39 compare respectively in opposite polarities the output signal of the clamp circuit 23 with the pedestal level derived from the clamp circuit 34 and the comparators 40 and 41 compare the output signal of the clamp circuit 24 with the pedestal level in the same manner. That is, the output (pedestal level) of the clamp circuit 34 to be supplied to plus inputs of the comparators 38 and 40 is pulled-up by a voltage ($\Delta E$) so as to be slightly higher than the pedestal level by pull-up resistors 42 and 43 respectively and that to be supplied to minus terminals of the comparators 39 and 41 is pulled-down by a voltage ($-\Delta E$) so as to be slightly lower than the pedestal level by pull-down resistors 44 and 45 respectively.

Therefore, when the R-Y and B-Y signals obtained in this stage contain signals of blue (the color determined to be pursued) components, output signals of the clamp circuits 23 and 24 at a time when the blue color signal is detected, are substantially the same as the pedestal level and when they are lower than $\Delta E$ but higher than $-\Delta E$, the combined outputs of the comparators 38 to 41 become "H".

That is, since the outputs of the comparators 38, 39, 40 and 41 are connected together, the combined output signal becomes "H" when the blue color signal is inputted and it becomes "L" when the inputted signal is other than the blue color signal.

In other words, the comparators 38, 39, 40 and 41 detect only signal duration for which both the clamped color difference signals are very close to the pedestal level, where the clamped color difference signals represent a specific signal namely the blue, and the comparators 38, 39, 40 and 41 output "H" level for that duration.

The combined output signal from the comparators 38, 39, 40 and 41 is supplied to sampling gates 46, 47, 48 and 49. A first pair of sampling gate pulses La and Ra synchronized with the CB pulse is generated by a pulse generator 50, the sampling gate pulses La and Ra are supplied respectively to the sampling gates 46 and 47. A second pair of sampling gate pulses Lb and Rb synchronized also with the CB pulse is generated by the pulse generator 50, and the sampling gate pulses Lb and Rb are supplied respectively to the sampling gates 48 and 49.

Figure 2:
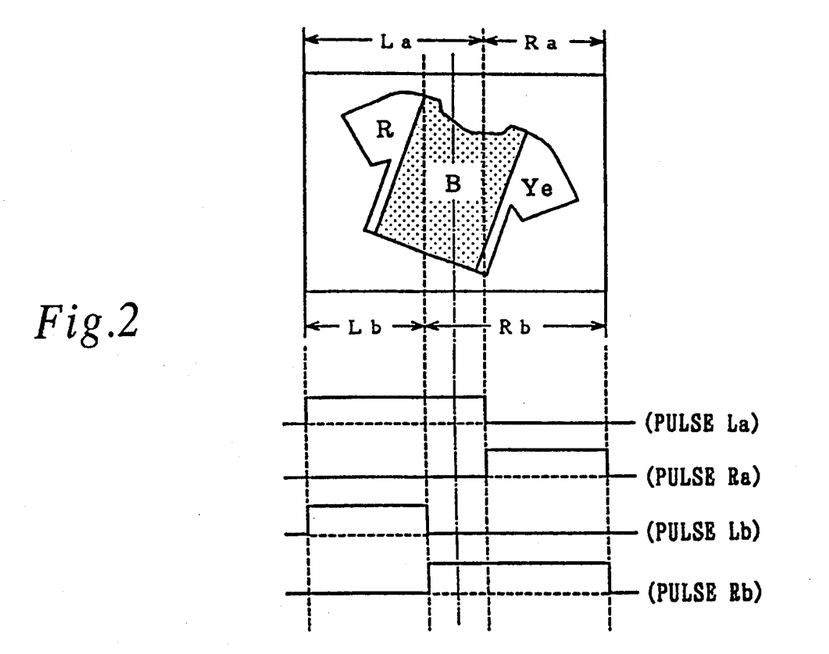
FIG. 2 shows a correspondence between an image of object on a camera image and an output timing of sampling pulse (image divisions in a horizontal scanning period)

As shown in FIG. 2, these sampling gate pulses are so generated having respective pulse durations and timings to divide and share the camera image with respect to its horizontal scanning period as such that a division by the sampling gate pulses La and Ra is offset at a distance from a vertical center line of the camera image in one direction and a division by the sampling gate pulses Lb and Rb is offset at the same distance from the vertical center line in another direction. Regions in the camera image thus divided are named after the sampling gate pulses which share their respective regions.

The sampling gates 46, 47, 48 and 49 gate the combined output from the comparators 38, 39, 40 and 41 and supply constant currents for "H" level durations of the combined output in the durations of the gate pulses La, Ra, Lb and Rb respectively, to the electrolytic capacitors 51, 52, 53 and 54 to charge them.

Accordingly, in the example shown in FIG. 2, the region La contains the specific color (blue) more than the region Ra does, this causes the voltage V(La) of the electrolytic capacitor 51 to be higher than the voltage V(Ra) of the electrolytic capacitor 52, and the region Rb contains the specific color more than the region Lb does, this causes the voltage V(Rb) of the electrolytic capacitor 54 to be higher than the voltage V(Lb) of the electrolytic capacitor 53.

The voltages V(La) and V(Ra) are compared with each other by the comparator 55 and the voltages V(Lb) and V(Rb) are compared with each other by the comparator 56. As a result, of the example shown in FIG. 2, it becomes V(La)>V(Ra) and V(Lb)<V(Rb) and thus the outputs of the comparators 55 and 56 become both "H". However, when the object is shifted leftward, it becomes V(La)>V(Ra) and V(Lb)>V(Rb). Thus, the output of the comparator 55 becomes "H" while the output of the comparator 56 becomes "L". On the other hand, when the object is shifted in the opposite direction (rightward), it becomes V(La)<V(Ra) and V(Lb) V(Rb). Thus, the output of the comparator 55 becomes "L" while the output of the comparator 56 becomes "H".

Therefore, by enabling the motor driver 16 to control the motor 4 according to the outputs of the comparators 55 and 56, it becomes possible to automatically pursue the movement of the object.

That is, when the outputs of the comparators 55 and 56 are both "H", it is deemed that the object is located in the center portion of the camera image, so that the motor 4 is stopped. When the outputs of the comparators 55 and 56 are "H" and "L", respectively, the motor 4 is controlled to rotate the video camera 1 such that the optical axis 1a thereof is moved leftward. When the outputs of the comparators 55 and 56 are "L" and "H", respectively, the motor 4 is controlled to rotate the video camera 1 rightward of its optical axis 1a.

As a result, the video camera 1 is moved left or right according to the movement of the specific color of the object so that the object can be located always in the center portion of the camera image.

In the described embodiment, the specific color of the object is sampled and compared in the respective regions La, Ra, Lb and Rb which are divided by the boundary lines equally separated in opposite directions each other from the center line of the camera image and the control signal for the motor 4 is obtained from the result of two comparisons.

Therefore, unlike the case where the camera image is simply divided to two regions by the center line, it is possible to prevent hunting movement of the video camera which may occur otherwise when the object is located substantially in the center region of the camera image, enabling a natural, smooth shooting.

Further, in this embodiment, the motor driver 16 controls the rotational speed of the motor 4 by utilizing a zoom lens positional voltage which is generated according to the magnification of zoom lens in the magnification control section 11. This scheme is employed to solve difficulty of accurate pursuit of the object when the video camera is rotated at a fixed speed despite a fact that the moving speed of the object within the camera image becomes faster proportionally to the magnification of zoom. That is, in the present invention, the motor driver 16 controls the motor 4 at a speed which is inverse-proportional to the zoom lens positional voltage representing the magnification of zoom.

It should be noted that the lens to be mounted on the video camera is not limited to the zoom lens but can be a group of interchangeable lenses as long as the lens positional voltage is changed according to an interchanged lens.

Further in this embodiment, although a portion of an object colored with a specific color is enlarged (zoom up) to a full scale in the camera image and registered, it is not always necessary to enlarge such portion to the full scale, instead, a color signal whose amount is maximum among others under the condition of enlarged camera image (field of vision viewed and taken by the camera with a certain zoom magnification), may be selected and registered as the specific color. Further, it may be possible to register a specific color by shifting the video camera so as to pick a specific portion of the object without zooming it up or taking a whole image of the object, an by bringing the specific portion into an assigned area of the camera image with an aid of such as monitor screen or EVF (electronic view finder).

In the described embodiment, the object is pursued by controlling horizontally the rotational direction and speed of the optical axis 1a of the video camera 1, however it is possible to constitute an object pursuing device capable of moving the video camera vertically (vertical panning) by using a similar pursuing device to that used in the described embodiment. A second embodiment having the latter construction in addition to the horizontal control mechanism will be described.

Figure 4:
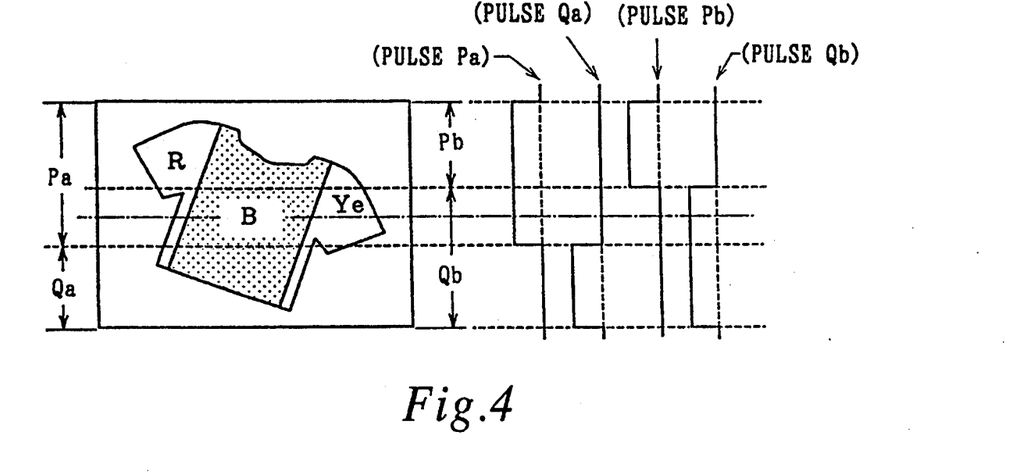
FIG. 4 shows a correspondence between an image of object on the camera image and an output timing of sampling pulse (image divisions in a vertical scanning period)

In the second embodiment, a division/comparison section 15 and a motor driver 16 which are identical to those shown in FIG. 3, are separately provided and the output timings of the first and second pairs of the sampling gate pulses to be generated by the pulse generator 50 are arranged such as shown in FIG. 4.

In the first embodiment, the sampling gate pulse pairs are generated such that the horizontal scanning period is divided at different locations, however, in the second embodiment, two pairs of sampling gate pulses Pa and Qa and Pb and Qb are generated at timings arranged along a vertical scanning period dividing the camera image vertically in order to pursue a vertical movement of the object.

Figure 5:
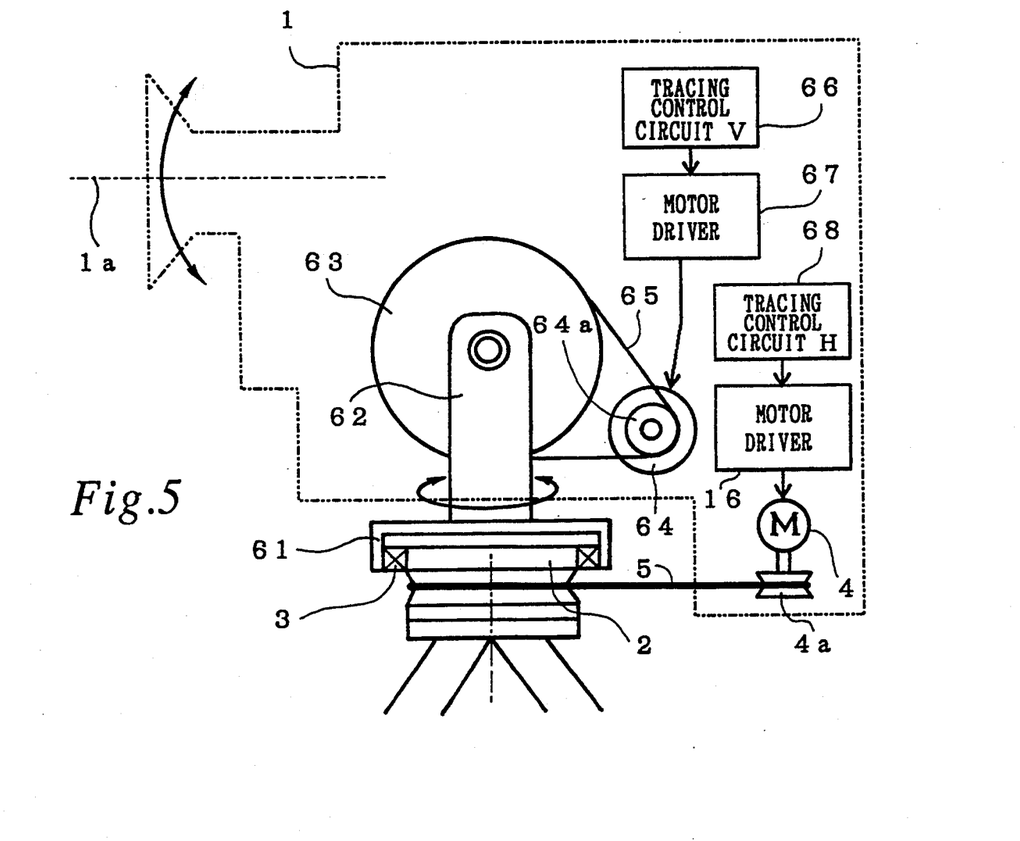
FIG. 5 is a block diagram of a video camera equipped with a pursuit control device capable of pursuing an object in horizontal and vertical directions.

A rotary mechanism of a video camera 1 of the second embodiment is constituted as shown in FIG. 5. In FIG. 5, a support 62 is mounted on a table 61 which is rotatably mounted on the tripod 2 by means of the rollers 3, and a pulley 63 rotatable with the video camera 1 mounted on the support 62, is driven by a motor 64. Driving force is transmitted through a pulley 64a on the motor 64 and a belt 65.

In FIG. 5, a reference numeral 66 depicts a tracing control circuit V provided for vertical panning and 67 a motor driver for driving the motor 64. A reference numeral 68 indicates a tracing control circuit H for horizontal panning, which corresponds to the pursuit control circuit shown in FIG. 3.

In the second embodiment, according to the same principle used for the horizontal pursuit, it is possible to automatically pursue the object both vertically and horizontally so that the object will always be located at the center portion of the camera image.

Further, by arranging the provision of the divided regions in the division/comparison section 15 and the rotational speed control of the video camera 1 by the motor driver 16, it is possible to further improve an accuracy of pursuit.

For example, when the object moves quickly, the object may become out of the camera image if the video camera 1 is always controlled to be rotated at a fixed standard speed.

Figure 6:
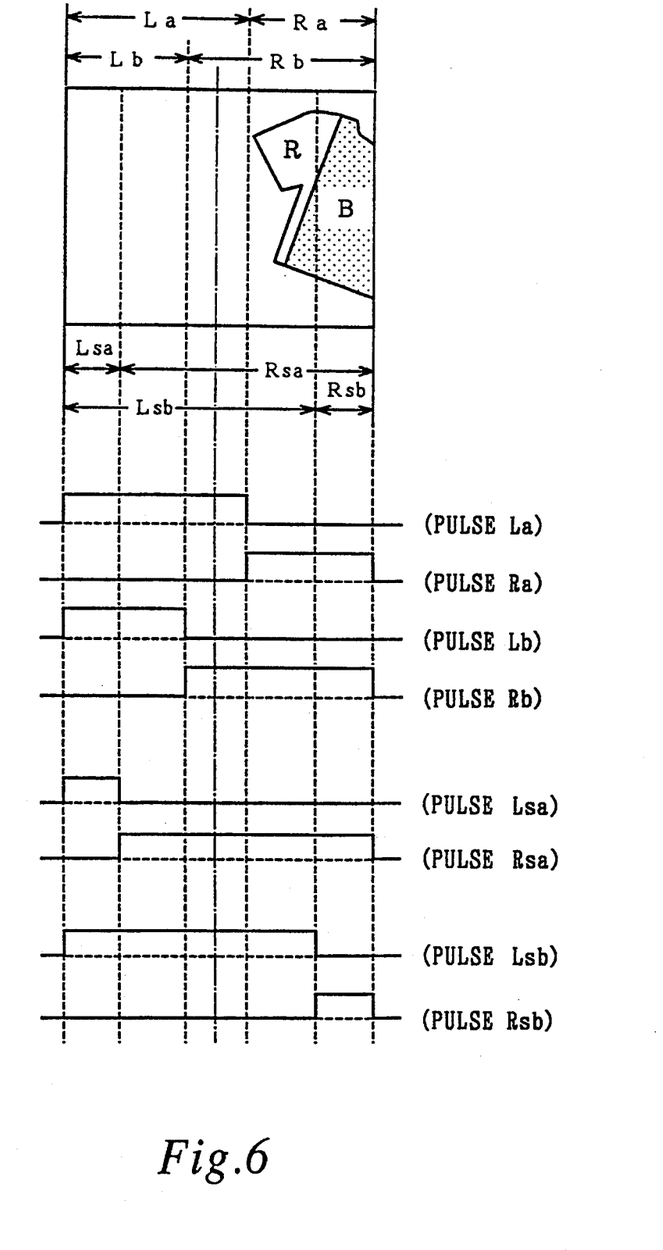
FIG. 6 shows a correspondence between an image of object on the camera image and an output timing of sampling pulse (image divisions in a horizontal scanning period).

Such problem can be solved by further setting subregions Lsa and Rsb in side portions of the camera image as shown in FIG. 6 and rotating the video camera 1 at a higher speed than the standard speed when a specific color signal is detected mainly in either sub-region.

In such case, the pulse generator 50 of the division/comparison section 15 in FIG. 3 may be designed to generate sampling gate pulses Lsa, Rsa, Lsb and Rsb in addition to the sampling gate pulses La, Ra, Lb and Rb at timings shown in FIG. 6.

And sampling gates corresponding to the additional sampling gate pulses, a comparator for comparing amounts of the specific color signal in respective periods of the sampling pulses Lsa and Rsa and another comparator for comparing amounts of the specific color signal in respective periods of the sampling pulses Lsb and Rsb, may be provided additionally.

When the amount of the specific color signal detected in the region Lsa is larger than that in the region Rsa, the motor driver 16 controls the video camera 1 to move leftward at a higher speed than the standard speed, for example, 2.5 times the standard speed, and when the amount of the specific color signal detected in the region Rsb is larger than that in the region Lsb, the motor driver 16 controls the video camera 1 to move rightward at a similar speed. In FIG. 6, since the specific color, that is blue color, is detected mainly in the region Rsb, the video camera will be rotated rightward at the high speed.

Therefore, on the camera image, the object will be returned quickly toward the center portion of the camera image and, thereafter, the pursuit at the standard speed is resumed.

The vertical tracing can be performed in the same way as the horizontal pursuit although the latter only is shown in FIG. 6.

Summarizing the present invention shown and described in the foregoing, the color signals which are to be processed in the usual video camera are utilized to automatically pursue an object. Therefore, it is possible to take easily an aimed object while pursuing it smoothly and accurately by a relatively simple and inexpensive circuit construction, the invention has no drawbacks inherent to the method which utilizes sound or infrared light.

Further, since a specific color is detected from an actual object, the initial registration of the specific color is simplified with improved pursuit accuracy.

Since the optical axis of video camera is controlled upon determination of amounts of the detected specific color as signals derived from 2 pairs of regions of which boundaries between left and right or up and down regions are offset each other equally from a center line of camera image, it is possible to prevent a hunting movement of the video camera when a slow moving object is substantially at the center portion of the camera image resulting in a smooth object pursuing operation.

Further, by setting sub-regions at opposite sides of the camera image and driving the video camera at a higher speed than the standard speed when the specific color signal is detected mainly in one of the sub-regions, it is possible to prevent the object from getting out of the camera image when its movement is very fast.

What is claimed is:

1. An object pursuing method for pursuing an object by a video camera, comprising:
    a color registration step for selecting a single color from color components of the object within a single camera image taken by said video camera and electrically registering the single color as a specific color;
    a signal detecting step for detecting a first signal representing said specific color registered in said color signal registration step out of a second signal which includes said first signal and represents said single camera image containing said object;
    a dividing and determining step for dividing the single camera image in its entirety thereof into a plurality of symmetrical regions and determining which one of the plurality of regions contains most of said first signal representing said specific color; and
    a drive control step for moving and/or rotating said video camera and for directing an optical axis of said video camera toward said one of the plurality of regions which was determined to contain most of said first signal.

2. An object pursuing method claimed in claim 1, wherein said drive control step further comprises a step of changing a rotational speed of said video camera corresponding to a magnification of lens provided on said video camera.

3. An object pursuing method claimed in claim 2, wherein said lens is a zoom lens.

4. An object pursuing method claimed in claim 2, wherein said lens is a zoom lens and a magnification of the zoom lens is represented by a positional voltage, and wherein said rotational speed of said video camera is inverse-proportional to said positional voltage.

5. An object pursuing method claimed in claim 1, wherein said dividing and determining step further comprises steps of dividing the camera image by two boundary lines which are offset from each other equally from a center line of the camera image for producing two pairs of regions, and comparing the amount of said first signal in said two pairs of regions, and wherein said drive control step further comprises a step of stopping movement of said video camera when the amount of said first signal in one of said two pairs of regions is substantially equal to the amount of said first signal in the other of said two pairs of regions, and wherein said optical axis of the video camera is directed toward one of said two pairs of regions when said results are different from each other, said one of said two pairs of regions being determined in said dividing and determining step.

6. The method claimed in claim 5, wherein said plurality of regions include sub-regions provided at both sides of said camera image in addition to said two pairs of regions, and wherein one of the sub-regions containing most of said first signal, is determined in said dividing and determining step resulting in said optical axis of the video camera being directed toward said one of the sub-regions at a speed higher than a standard speed.

7. An object pursuing method claimed in claim 1, wherein said color registration step further comprises a first step of enlarging said object in the camera image, and a second step of registering said specific color of the object enlarged in said first step.

8. An object pursuing method claimed in claim 1, wherein an image of said single color selected in the color registration step is located at a center portion of said single camera image in said drive control step.

9. An object pursuing system for pursuing an object by a video camera, comprising:
    color registration means for selecting a single color from color components of the object within a single camera image taken by said video camera and electrically registering the single color as a specific color;
    signal detecting means for detecting a first signal representing said specific color registered by said color signal registration means out of a second signal which includes said first signal and represents said single camera image containing said object;
    dividing and determining means for dividing the single camera image in its entirety into a plurality of symmetrical regions and determining which one of the plurality of regions contains most of said first signal representing said specific color and for producing a third signal as a result of said determination; and
    drive control means for moving and/or rotating said video camera and for directing an optical axis of said video camera toward the object in response to said third signal.

10. An object pursuing system claimed in claim 9, wherein said drive control means moves said video camera so that an image of said single color selected by said color registration means is brought into a center portion of said single camera image.

11. An object pursuing system claimed in claim 9, wherein said object pursuing system further comprises deactivating means for deactivating said color registration means so that said video camera is allowed to move for pursuing said object manually.

12. An object pursuing system claimed in claim 9, wherein said video camera is provided with a zoom lens and a magnification of the zoom lens is represented by a positional voltage, and wherein said drive control means moves the video camera at a speed being inverse-proportional to said positional voltage.

13. An object pursuing method for pursuing an object by a video camera comprising:
- a color registration step for selecting a single color from color components of the object within a single camera image taken by said video camera and electrically registering the single color as a specific color;
- a signal detecting step for detecting a first signal representing said specific color registered in said color signal registration step out of a second signal which includes said first signal and represents said single camera image containing said object;
- a dividing and determining step for dividing the single camera image in its entirety into a plurality of symmetrical regions including sub-regions provided at both sides of said single camera image and determining which one of the plurality of regions or said sub,regions contains most of said first signal representing said specific color; and
- a drive control step for moving and/or rotating said video camera and for directing an optical axis of said video camera toward one of said regions or sub-regions at a first speed when one of said regions is determined to contain most of said first signal and at a second speed higher than said first speed when said one of said subregions is determined to contain most of said first signal in said dividing and determining step.

* * * * *